United States Patent [19]

Hirosaki

[11] Patent Number: 4,644,238
[45] Date of Patent: Feb. 17, 1987

[54] AIRFLOW CONTROL APPARATUS
[75] Inventor: Yoshihiko Hirosaki, Hyogo, Japan
[73] Assignee: Mitsubishi Denki Kabushiki Kaisha, Tokyo, Japan
[21] Appl. No.: 657,404
[22] Filed: Oct. 3, 1984
[30] Foreign Application Priority Data Nov. 16, 1983 [JP] Japan .................................. 58-21709
Apr. 2, 1984 [JP] Japan .................................. 59-65422
Apr. 2, 1984 [JP] Japan .................................. 59-65423

[51] Int. Cl.⁴ ............................................. H02P 3/00
[52] U.S. Cl. .................... 318/332; 318/434; 318/427; 318/473; 307/87; 307/64; 361/23; 361/24
[58] Field of Search ............... 318/332, 333, 336, 344, 318/440, 565, 800–808, 283, 284, 285, 471–476; 307/43, 44, 54, 56, 61, 63, 64, 65, 66, 67, 68, 71, 75, 85, 86, 87, 129, 131; 361/23, 24, 30, 31

[56] References Cited

U.S. PATENT DOCUMENTS

| | | | |
|---|---|---|---|
| 3,530,362 | 9/1970 | Filimonov et al. | 307/64 X |
| 3,576,485 | 4/1971 | Coons, Jr. | 318/332 X |
| 3,612,894 | 10/1971 | Schmidt | 307/64 |
| 3,708,719 | 1/1973 | Ishikawa | 361/23 |
| 3,749,992 | 7/1973 | Jones | 318/473 X |
| 3,753,069 | 8/1973 | Newton | 307/64 X |
| 3,761,733 | 9/1973 | Wolpert | 307/64 |
| 3,886,407 | 5/1975 | Anderson | 361/23 |
| 3,909,621 | 9/1975 | Nollace et al. | 307/64 |
| 3,957,329 | 5/1976 | McConnell | 361/16 X |
| 3,997,818 | 12/1976 | Bodkin | 361/100 |
| 4,243,920 | 1/1981 | Brehm | 318/284 X |
| 4,262,214 | 4/1981 | Patel | 361/92 X |
| 4,277,692 | 7/1981 | Small | 307/66 |
| 4,333,119 | 6/1982 | Schoenmeyr | 361/92 X |
| 4,361,793 | 11/1982 | Nordell | 318/805 X |
| 4,381,457 | 4/1983 | Wiles | 307/64 |
| 4,437,133 | 3/1984 | Rueckert | 318/345 C X |
| 4,454,930 | 6/1984 | Nomura et al. | 307/64 X |

Primary Examiner—William M. Shoop, Jr.
Assistant Examiner—Shik Luen Paul Ip
Attorney, Agent, or Firm—Bernard, Rothwell & Brown

[57] ABSTRACT

An apparatus for controlling an airflow to a boiler or the like and maintaining a desired quantity thereof. The apparatus comprises a controller for generating a control signal of a level corresponding to a required airflow, a variable-frequency power supply for producing an output of a frequency corresponding to the control signal level so as to drive a ventilation-actuating motor, and means for detecting any deviation of the control signal level from a predetermined range and retaining the frequency of the motor-driving output at a proper value, whereby the airflow is maintained at or above a preset value.

7 Claims, 8 Drawing Figures

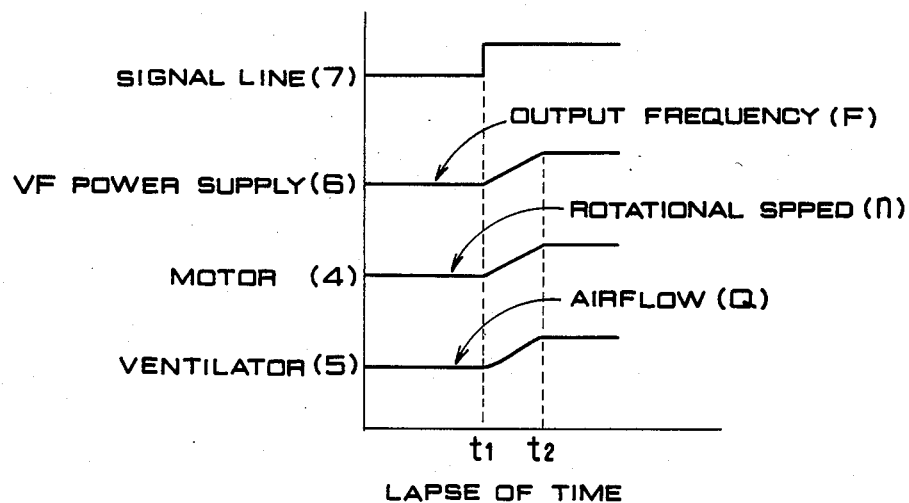
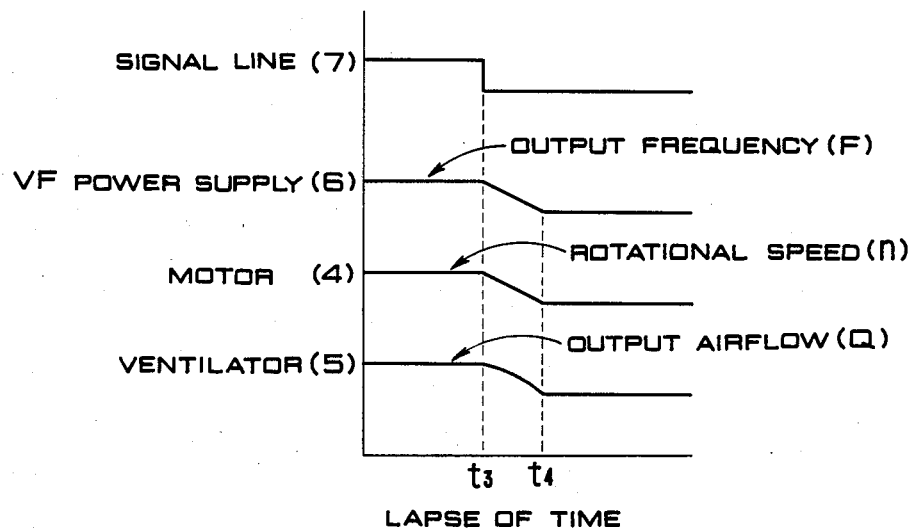

AIRFLOW CONTROL APPARATUS

BACKGROUND OF THE INVENTION

1. Field of the Invention

The present invention relates to airflow control for a boiler or the like, and more particularly to an airflow control apparatus for use in a system where a ventilator is driven by a motor energized from a variable frequency power supply.

2. Description of the Prior Art

A conventional control apparatus of this type known heretofore has a constitution of FIG. 1, wherein there are shown a commercial power line 1, breakers 2 and 3, a motor 4, a ventilator 5 connected directly to the motor, a VF (variable frequency) power supply 6, a controller 8 for feeding an operating frequency signal to the VF power supply 6, and a signal line 7 of the controller 8. FIG. 2 graphically shows the relationship between an operating frequency and a frequency command signal outputted from the controller 8.

FIGS. 3 and 4 are explanatory diagrams relative to FIG. 1, wherein: $t_1$ is a time when an increment command is outputted from the controller 8; $t_2$ is a time when increasing the output of the VF power supply 6 is completed; $t_3$ is a time when a fault occurs on the signal line 7; and $t_4$ is a time when a change in the output of the VF power supply 6 is completed posterior to occurrence of the fault.

In such conventional control apparatus, the operation is performed in the following manner.

In FIG. 1, a voltage is applied from the commercial power line 1 via the breaker 2 to the VF power supply 6. The rotational speed n of the motor 4 is dependent on the output frequency F of the VF power supply 6 as given by Eq. (1) below.

$$n = \frac{120 \times F}{P} \tag{1}$$

Thus, the rotational speed n varies in proportion to the frequency F of the applied voltage. It follows that a change in the output frequency F of the VF power supply 6 causes a change in the rotational speed of the motor 4. The ventilator 5 connected directly to the motor 4 sends to a boiler an output airflow Q which is substantially proportional to the rotational speed n of the motor 4. In an exemplary case of a power plant, when there arises a change in the demand from a power system or in a fuel feed condition, the airflow Q required for the boiler comes to vary as well, and a command signal for changing the airflow Q is outputted from the controller 8 via the signal line 7 to the VF power supply 6, which then produces an output of a frequency F corresponding to the required airflow Q.

FIG. 2 graphically shows the relationship between the operating frequency and the frequency command current outputted from the controller 8. It is plotted in this gragh that the controller 8 produces a frequency command signal of a current from 4 to 20 mA for varying the operating frequency of the VF power supply 6 in a range of 10 to 40 Hz.

FIG. 3 is an explanatory diagram relative to a normal operation performed in the conventional apparatus of FIG. 1. The controller 8 requests increase of the airflow Q at time $t_1$ and feeds a frequency command signal via the signal line 7 to the VF power supply 6. Generally the VF power supply 6 is so designed as to increase or decrease the output thereof at a predetermined rate in response to the request for variation. Accordingly, the output frequency F of the VF power supply 6 is somewhat delayed with respect to the variation request time $t_1$, and the action to execute the variation request is terminated at time $t_2$. And the rotational speed n of the motor 4, hence the output airflow Q of the ventilator 5, comes to vary in accordance with the output frequency F of the VF power supply 6.

FIG. 4 shows an example with a fault or abnormal state caused on the signal line 7 of FIG. 1. In this case where the fault is disconnection of the signal line 7, the controller 8 keeps requesting a predetermined airflow Q with its output remaining unchanged, but the signal line is interrupted at time $t_3$ so that no further input is fed to the VF power supply 6. As described previously in relation to FIG. 3, the output frequency F of the VF power supply 6 is decreased to its lower limit with some delay, and simultaneously the rotational speed n of the motor 4 is also decreased to bring about a reduction in the output airflow Q of the ventilator 6.

In the conventional apparatus having the constitution described above, when the frequency command signal from the controller 8 becomes abnormal or comes to be extinct due to disconnection or other fault of the signal line 7, the VF power supply 6 drives the motor 4 by the aforesaid fault signal. Consequently, some disadvantages have been unavoidable heretofore including that the ventilator 5 connected directly to the motor 4 fails to maintain the required airflow, thereby inducing the possibility of extinguishing the fire in the boiler or even causing its explosion.

SUMMARY OF THE INVENTION

The object of the present invention resides in providing an improved airflow control apparatus capable of minimizing a variation induced in the rotational speed of a motor for a ventilator when a normal signal fails to be fed to a VF power supply due to generation of a fault signal from a controller or due to occurrence of disconnection of a signal line via which the output signal of the controller is fed to the VF power supply.

In brief, the airflow control apparatus according to the invention comprises a control circuit for generating a control signal corresponding to a desired airflow, a signal line for introducing the control signal to a control input terminal of a VF power supply, and a fault signal detector which checks whether the control signal on the signal line is normal or abnormal and, in the latter case, produces a command for supplying a drive current of a preset frequency to a ventilator-actuating motor.

In an exemplary embodiment of the invention, the fault signal detector has means to produce an output signal upon detection of any abnormality in the control signal, and means to switch the motor from the VF power supply to the commercial power line in response to the detection signal.

In another embodiment of the invention, the fault signal detector includes means to produce an output signal upon detection of any abnormality in the control signal, means to raise, in response to the detection signal, the output frequency of the VF power supply at a fixed rate to the vicinity of the upper limit of a predetermined frequency variation range, and means to switch the motor from the VF power supply to the commercial power line after completion of such rise of the frequency.

In further embodiment of the invention, the fault signal detector includes means to produce an output signal upon detection of any abnormality in the control signal, and means to lock, in response to the detection signal, the output frequency of the VF power supply at the value immediately anterior to detection of the abnormality.

BRIEF DESCRIPTION OF THE DRAWINGS

FIGS. 3 and 4 respectively show signal level variations induced in the outputs of individual components due to sharp rise and fall of the signal level via a signal line to the VF power supply in the apparatus of FIG. 1;

DETAILED DESCRIPTION OF THE PREFERRED EMBODIMENTS

Figure 1:
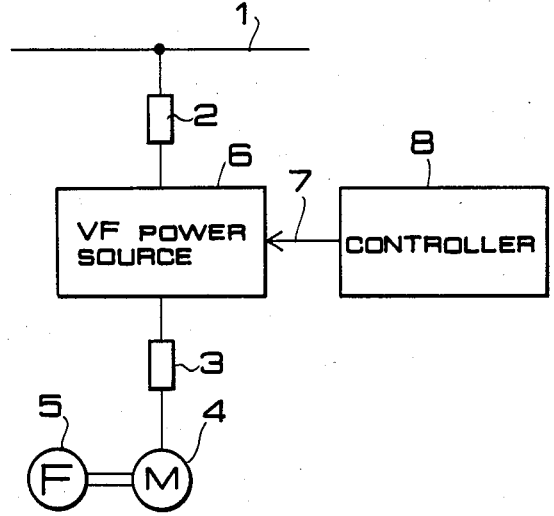
FIG. 1 is a block diagram showing the constitution of a conventional airflow control apparatus.
Figure 5:
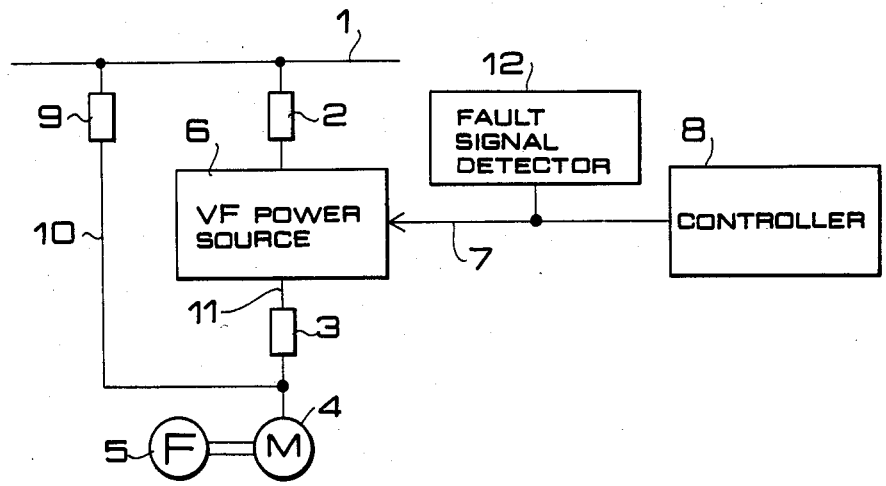
FIG. 5 is a block diagram of an exemplary airflow control apparatus embodying the present invention.

In an exemplary airflow control apparatus of FIG. 5 embodying the present invention, there are shown a commercial power line 1, breakers 2 and 3, a motor 4, a ventilator 5, a VF (variable frequency) power supply 6, a signal line 7 and a controller 8, all of which are equivalent to those shown previously in FIG. 1. Therefore, repeated description of such components is omitted here. In addition thereto, a breaker 9 is inserted in a line 10 which connects the motor 4 to the commercial power line 1. In order to supply required electric power from the commercial power line 1 to the motor 4, there are provided a main line 11 including the aforesaid breaker 2, VF power supply 6 and breaker 3, and also an auxiliary line 10 including the breaker 9.

Figure 2:
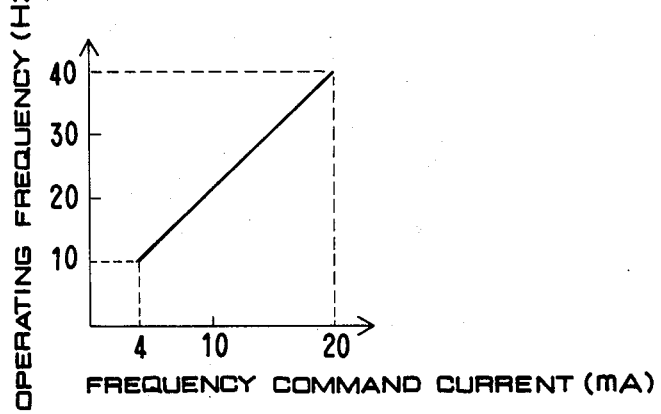
FIG. 2 graphically shows the relationship between the input control signal current and the output signal frequency of a VF power supply in the apparatus of FIG. 1.

A fault signal detector 12 keeps monitoring the control signal level on the signal line 7 and, upon deviation of the signal level from a predetermined range, judges the control signal to be abnormal and executes an action of opening the breakers 2 and 3 while closing the breaker 9. In an exemplary case where a control signal of a current level ranging from 4 to 20 mA as shown in FIG. 2 is fed from the controller 8 via the signal line 7 to the VF power supply 6, if the current level varies to be below 4 mA or above 20 mA, the fault signal detector 12 judges the control signal to be abnormal and executes the aforesaid action. The same action is executed also in the case of disconnection of the signal line 7.

It is possible for those skilled in the art to constitute with facility the fault signal detector 12 that carries out such action by a combination of a current-voltage converter, two voltage comparators and a switching means actuated by the outputs of the comparators.

Figure 6:
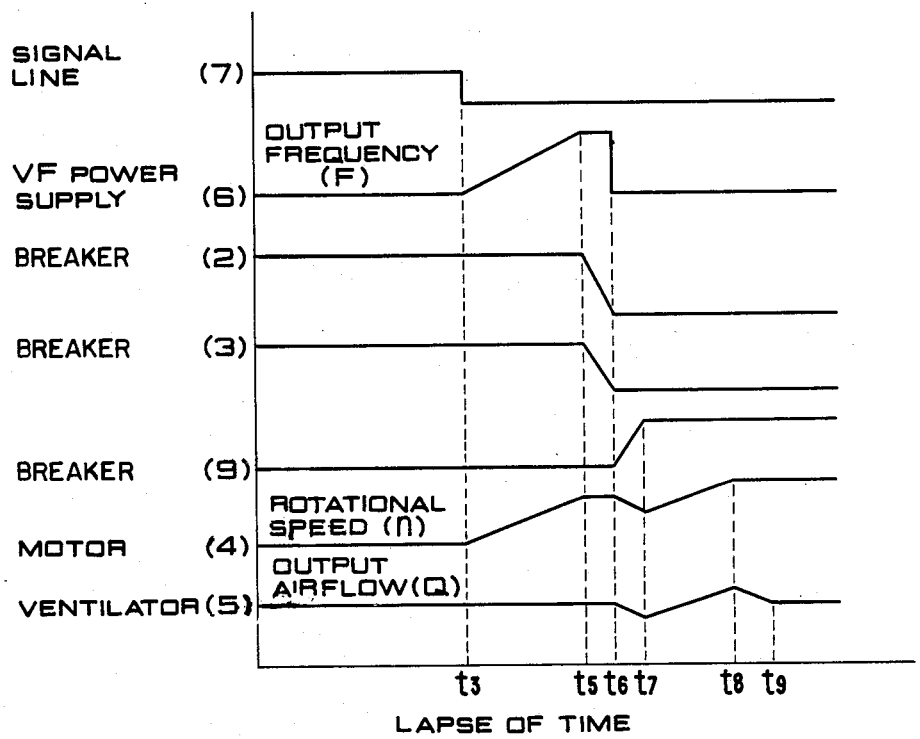
FIG. 6 graphically shows changes caused in the operating states of individual components when the control signal level sharply falls in the apparatus of FIG. 5.

The fault signal detector 12 may further include a level control means which, upon detection of any abnormality relative to the signal line 7 or the control signal being fed to the VF power supply 6, raises the level of the control signal at a fixed rate to a predetermined upper limit thereof regardless of the output of the controller 8 prior to opening the breakers 2 and 3 while closing the breaker 9. FIG. 6 shows the transitions of operating states of the individual components in such arrangement.

In FIG. 6: $t_5$ is a time when the output frequency F of the VF power supply 6 reaches the vicinity of the upper limit of a predetermined frequency control range; $t_6$ is a time when the breakers 2 and 3 are completely opened $t_7$ is a time when the closing of breaker 9 is completed; $t_8$ is a time when the rotational speed n of the motor 4 reaches a value corresponding to the frequency of the commercial power line 1; and $t_9$ is a time when the output airflow Q of the ventilator 5 is stabilized at a steady-state value.

If disconnection occurs at time $t_3$ in the signal line 7 between the controller 8 and the VF power supply 6, the fault signal detector 12 immediately detects such abnormality, then raises the output frequency of the VF power supply 6 to the upper limit thereof at a fixed rate, and subsequently opens the breakers 2 and 3 (at time $t_6$) and closes the breaker 9 (at time $t_7$). The rotational speed n of the motor 4 increases gradually until the output frequency F reaches its upper limit (at time $t_5$), and then decreases due to opening of the breakers 2 and 3 which temporarily interrupts application of the voltage to the motor 4. And when the breaker 9 is closed, the rotational speed n increases again quickly to reach the value corresponding to the frequency of the commercial power line at time $t_8$.

For controlling the airflow Q of the ventilator, a mechanical inlet valve or damper (not shown) may be utilized as well as the aforementioned rotational speed n. In order to minimize the loss under control with the rotational speed n, the inlet valve is locked substantially at its fully open position. And when the fault signal detector 12 is actuated, the inlet valve is automatically opened or closed by an airflow control signal. That is, for the purpose of attaining a constant airflow, the inlet valve is narrowed down in accordance with acceleration of the rotational speed n so as to suppress increase of the airflow Q that may otherwise be induced due to the accelerated rotational speed n. Since the output frequency F rises gradually during a period between $t_3$ and $t_5$, narrowing down the inlet valve for the airflow Q is effected sufficiently in time, thereby maintaining the airflow Q constant during this period.

In FIG. 6, the output airflow Q once decreases after time $t_6$ with the breakers 2 and 3 opened and then commences increasing at time $t_7$ with the breaker 9 closed. The response of the inlet valve is usually delayed from increase of the airflow Q induced by fast acceleration of the rotational speed n. Accordingly, during such fast acceleration of the rotational speed n, the airflow Q increases somewhat slowly through the action of the inlet valve. And after arrival of the rotational speed n at a value corresponding to the frequency of the commercial power line (posterior to time $t_8$), the airflow Q is turned to decrease by the action of the inlet valve and thereby resumes the former value at time $t_9$. The output airflow Q is controlled in the manner mentioned above, and its variation is kept within a permissible range so that the operation can be continuously advanced in safety despite occurrence of any abnormality in the output signal of the controller 8 or on the signal line 7.

Although the airflow control has been described above with regard to the ventilator for a boiler, it is to be understood that application of the present invention is not limited to the boiler alone. Moreover, the same control action can be executed in the case of any other fault or abnormal state such as short-circuiting than the aforesaid disconnection of the signal line 7 taken as an exemplary fault. And in addition to such abnormality of the signal line 7, any abnormal output signal that results from a fault in the controller 8 is also detectable for control.

Furthermore, besides the foregoing arrangement where the output frequency F of the VF power supply 6 is raised immediately after actuation of the fault signal detector 12, it may be so modified as to raise the output frequency F of the VF power supply 6 after maintaining the same unchanged for a predetermined period of time.

Figure 7:
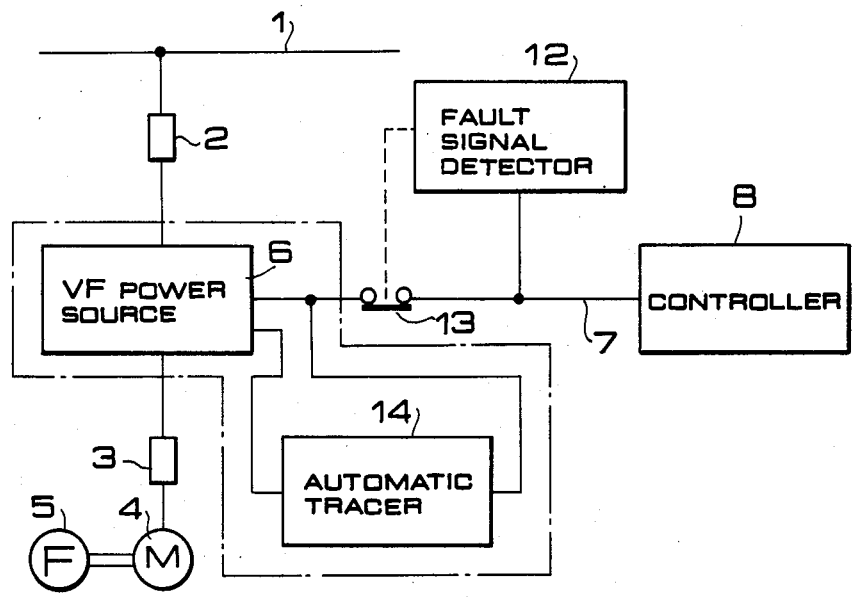
FIG. 7 is a block diagram of another exemplary airflow control apparatus embodying the invention.

FIG. 7 shows a further exemplary airflow control apparatus embodying the present invention, wherein, in addition to the components employed in the foregoing apparatus of FIG. 5, the fault signal detector 12 has switch means 13 inserted in the signal line 7 and turned off in response to detection of any abnormality in the signal being fed through the signal line 7, and an automatic follow-up circuit 14 which follows with some delay a change in the control signal on the signal line 7, then holds the control signal level immediately anterior to the actuation of the switch means 13 and, after turn-off of the switch means 13, continuously feeds the signal of the level being held to the control input terminal of the VF power supply 6.

The apparatus of FIG. 7 performs its operation in the following manner. When the fault signal detector 12 detects that the output signal of the controller 8 is beyond a current range of 4 to 20 mA graphed in FIG. 2 or no signal is existent on the signal line 7 due to disconnection thereof, the signal line 7 is open-circuited by the switch means 13. Then the automatic follow-up circuit 14 follows the output signal of the controller 8 with some delay and, upon interruption of the output signal, holds the signal level immediately anterior to such interruption. That is, when the fault signal detector 12 open-circuits the signal line 7 upon occurrence of disconnection or the like of the signal line 7, the automatic follow-up circuit 14 produces a signal to control the output of the VF power supply 6 at a fixed value. Consequently, the rotational speed n of the motor 4 and the airflow Q of the ventilator 5 are maintained constant by the fixed output of the VF power supply 6.

Figure 8:
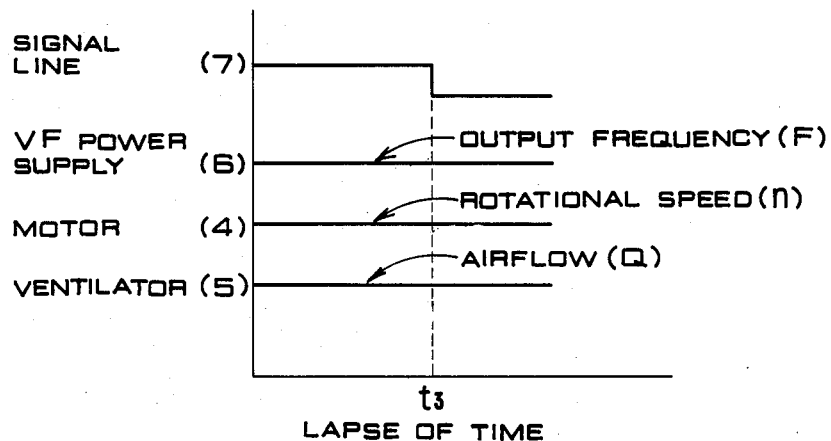
FIG. 8 graphically shows changes caused in the operating states of individual components when the control signal level sharply falls in the apparatus of FIG. 7.

FIG. 8 is an explanatory diagram relative to the above control action in an exemplary case where the output signal of the controller 8 has become nonexistent at time $t_3$ as a result of a fault such as disconnection of the signal line 7. In this case, the abnormal state is detected at time $t_3$ by the fault signal detector 12, and the output frequency F of the VF power supply 6 is maintained constant by the fixed output signal of the automatic follow-up circuit 14. Consequently, despite occurrence of any abnormality on the signal line 7, the output frequency F of the VF power supply 6 remains unchanged to maintain the normal operation at the signal level anterior to the fault of the signal line 7, thereby retaining the rotational speed n of the motor 4 and the airflow Q of the ventilator 5 without any change to eventually continue the operation in safety.

The airflow Q of the ventilator 5 is controllable by the use of, besides the aforesaid rotational speed n, an inlet valve or damper (not shown) which is a mechanical airflow regulator. In such a case, the inlet valve is locked substantially at its fully open position so as to minimize the loss under control with the rotational speed n. And when a steady operation is attained with the rotational speed n rendered constant in the aforementioned manner after detection of an abnormality by the fault signal detector 9, the inlet valve is released from the controlled lock in response to a change in the airflow required for the boiler, and the control mode is switched for following up the required airflow, thereby keeping the boiler operation safe.

As is manifest from the detailed description given hereinabove, according to the airflow control apparatus of the present invention, an automatic control action is executed to hold the rotational speed of the ventilator-actuating motor at or above a predetermined minimal value upon occurrence of any fault or abnormal state relative to the control signal being fed to the VF power supply. Therefore, the present invention is applicable advantageously to any system such as a boiler where ventilation is requisite.

What is claimed is:

1. In an airflow control apparatus having a ventilator-actuating motor driven at a rotational speed corresponding to a power supply frequency, a VF (variable frequency) power supply connected to a commercial power line for supplying an electric power to said motor, and a controller for feeding a control signal to said VF power supply so as to determine the output frequency thereof, the improvement comprising a fault signal detector including: means for detecting an abnormality relative to the control signal fed to said VF power supply and producing an output; and means actuated in response to the output of said detecting means and serving to actuate switch means for switching the input terminal of said motor from said VF power supply to said commercial power line; and level control means which is actuated in response to the output of said detecting means, said level control means raising the level of the control signal fed to said VF power supply to the upper limit of a predetermined variation range and subsequently actuating said switch means to connect said motor to said commercial power line.

2. The apparatus as defined in claim 1 wherein said control signal, upon detection of an abnormality, has a current level varied within a predetermined range in accordance with a required air flow.

3. The apparatus as defined in claim 1 and further including means for disconnecting said motor from said VF power supply before connecting said motor to said commercial power line.

4. The apparatus as defined in claim 2, wherein the current level of said control signal is varied within a range of 4 to 20 mA.

5. In an airflow control apparatus having a ventilator-actuating motor driven at a rotational speed corresponding to a power supply frequency, a VF (variable frequency) power supply connected to a commercial power line for supplying an electric power to said motor, and a controller for feeding a control signal to said VF power supply so as to determine the output frequency thereof, the improvement comprising: a fault signal detector for detecting an abnormality relative to the control signal fed to said VF power supply and actuating switch means to interrupt said control signal being fed to said VF power supply; and an automatic follow-up circuit for holding the level of said control signal immediately anterior to the action of said switch means and feeding said control signal of the held level to said VF power supply in succession to the action of said switch means.

6. The apparatus as defined in claim 5, wherein said control signal has a current level varied within a predetermined range in accordance with a required airflow.

7. The apparatus as defined in claim 6, wherein the current level of said control signal is varied within a range of 4 to 20 mA.

* * * * *